(12) United States Patent
Cartmill et al.

(10) Patent No.: US 10,667,373 B2
(45) Date of Patent: May 26, 2020

(54) SENSOR PLATFORM FOR STREETLIGHTS

(71) Applicant: LED Roadway Lighting Ltd., Halifax, Nova Scotia (CA)

(72) Inventors: Ken Cartmill, Halifax (CA); Gregory P. Jacklin, Victoria (CA); Tristan Laan, Lewis Lake (CA); Sean Roddick, Halifax (CA); Mark Neary, Halifax (CA); Damon Langlois, Halifax (CA); Simon H. Lightbody, Brentwood Bay (CA)

(73) Assignee: LED Roadway Lighting Ltd., Halifax, Nova Scotia (CA)

( * ) Notice: Subject to any disclaimer, the term of this patent is extended or adjusted under 35 U.S.C. 154(b) by 0 days.

(21) Appl. No.: 16/308,036

(22) PCT Filed: Jun. 8, 2017

(86) PCT No.: PCT/CA2017/050700
§ 371 (c)(1),
(2) Date: Dec. 7, 2018

(87) PCT Pub. No.: WO2017/210791
PCT Pub. Date: Dec. 14, 2017

(65) Prior Publication Data
US 2019/0313516 A1   Oct. 10, 2019

Related U.S. Application Data

(60) Provisional application No. 62/347,377, filed on Jun. 8, 2016.

(51) Int. Cl.
*H05B 47/19*   (2020.01)
*H02J 50/10*   (2016.01)
(Continued)

(52) U.S. Cl.
CPC .............. *H05B 47/19* (2020.01); *F21S 8/085* (2013.01); *F21S 8/086* (2013.01); *F21V 23/00* (2013.01); *F21V 23/0442* (2013.01); *G01S 13/04* (2013.01); *G01S 13/91* (2013.01); *G08G 1/04* (2013.01); *G08G 1/065* (2013.01); *G08G 1/087* (2013.01); *H02J 50/00* (2016.02);
(Continued)

(58) Field of Classification Search
CPC combination set(s) only.
See application file for complete search history.

(56) References Cited

U.S. PATENT DOCUMENTS 4,773,866 A * 9/1988 Basques ................. H01R 39/64
439/21
7,321,115 B2 * 1/2008 Langlois ................... G01J 1/02
250/214.1
(Continued)

*Primary Examiner* — Travis R Hunnings
(74) *Attorney, Agent, or Firm* — Stevens & Showalter LLP

(57) ABSTRACT

A streetlight sensor platform comprising a sensor module which is coupled to a controller section having a lower portion for interfacing with a receptacle of a streetlight and an upper portion for receiving the sensor module. The sensor module is coupled to the controller section without the need for tools allowing easy installation and replacement. The sensor can be utilized for intelligent lighting and event notification such as public safety, emergency vehicle alerts, traffic monitoring, alerts and dynamic lighting applications.

15 Claims, 15 Drawing Sheets

(51) Int. Cl.

| | | |
|---|---|---|
| *F21S 8/08* | (2006.01) | |
| *F21V 23/04* | (2006.01) | |
| *H04L 29/08* | (2006.01) | |
| *G08G 1/065* | (2006.01) | |
| *H02J 50/00* | (2016.01) | |
| *F21V 23/00* | (2015.01) | |
| *G08G 1/04* | (2006.01) | |
| *G01S 13/04* | (2006.01) | |
| *G01S 13/91* | (2006.01) | |
| *G08G 1/087* | (2006.01) | |
| *H04W 4/38* | (2018.01) | |
| *H05B 47/12* | (2020.01) | |
| *H05B 47/105* | (2020.01) | |
| *F21W 131/103* | (2006.01) | |
| *H04W 84/18* | (2009.01) | |
| *G01S 5/18* | (2006.01) | |
| *H04W 4/90* | (2018.01) | |
| *H05B 45/00* | (2020.01) | |

(52) U.S. Cl.
CPC ............ *H02J 50/10* (2016.02); *H04L 67/125* (2013.01); *H04W 4/38* (2018.02); *H05B 47/105* (2020.01); *H05B 47/12* (2020.01); *F21W 2131/103* (2013.01); *G01S 5/18* (2013.01); *H04W 4/90* (2018.02); *H04W 84/18* (2013.01); *H05B 45/00* (2020.01); *Y02B 20/48* (2013.01)

(56) References Cited

U.S. PATENT DOCUMENTS

| | | | | |
|---|---|---|---|---|
| 9,144,135 | B2* | 9/2015 | Cleland | H05B 37/0245 |
| 9,192,029 | B2* | 11/2015 | Marquardt | H05B 37/0254 |
| 9,392,674 | B2* | 7/2016 | Lin | G01W 1/00 |
| 2010/0308980 | A1* | 12/2010 | Gosset | G08C 19/12 |
| | | | | 340/286.02 |
| 2012/0038490 | A1* | 2/2012 | Verfuerth | H05B 37/0272 |
| | | | | 340/910 |
| 2014/0210356 | A1* | 7/2014 | Jarrell | H05B 37/0245 |
| | | | | 315/153 |
| 2015/0021990 | A1* | 1/2015 | Myer | F21S 2/00 |
| | | | | 307/23 |
| 2015/0138000 | A1* | 5/2015 | Hartman | G08G 1/087 |
| | | | | 340/906 |
| 2015/0147064 | A1* | 5/2015 | Hartman | H05B 37/0272 |
| | | | | 398/106 |
| 2015/0362172 | A1* | 12/2015 | Gabriel | G08B 15/001 |
| | | | | 348/151 |
| 2019/0182671 | A1* | 6/2019 | Magnan | H04L 63/107 |
| 2019/0239316 | A1* | 8/2019 | Marquardt | F21S 8/086 |

* cited by examiner

US 10,667,373 B2

SENSOR PLATFORM FOR STREETLIGHTS

CROSS-REFERENCE TO RELATED APPLICATIONS

This application claims priority to U.S. Provisional Application No. 62/347,377 filed Jun. 8, 2016 the entirety of which is hereby incorporated by reference in its entirety for all purposes.

TECHNICAL FIELD

The present disclosure relates to streetlights and in particular to sensor and controllers for streetlights.

BACKGROUND

The integration of wireless control systems into streetlights provides improved management and efficiency benefits. However, in-field installation and integration with control systems can be challenging particularly with the growing integration of smart city systems. Current sensor deployments within city infrastructure are cumbersome as they require separate infrastructure, power and can be costly to deploy. The overlay of sensors on streetlight infrastructure, particularly with the growth of the Internet of things (IOT) technologies, increases the demand for the streetlight infrastructure to provide additional functionality to support smart city systems.

There is therefore a need for an improved sensor platform for streetlights.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figures 1A, 1B:
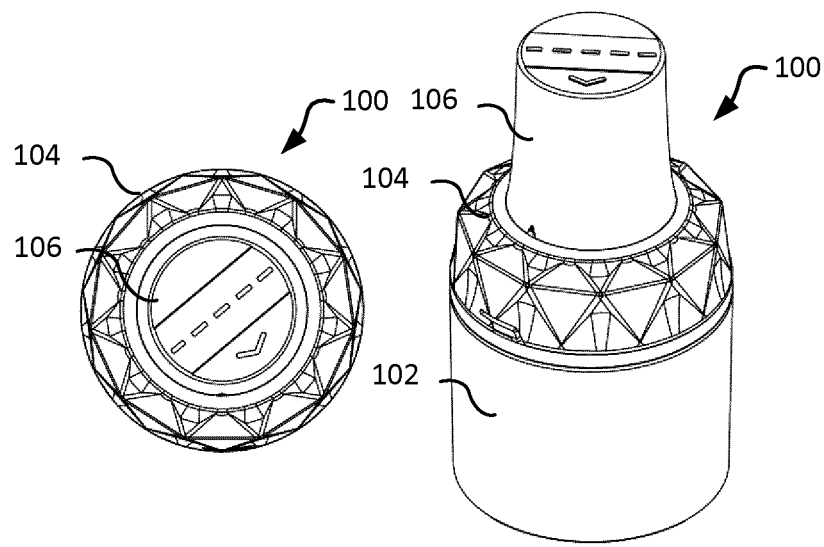
FIG. 1A shows an isometric view of a streetlight sensor platform.
FIG. 1B shows a top view of the streetlight sensor platform.
Figures 1C, 1D:
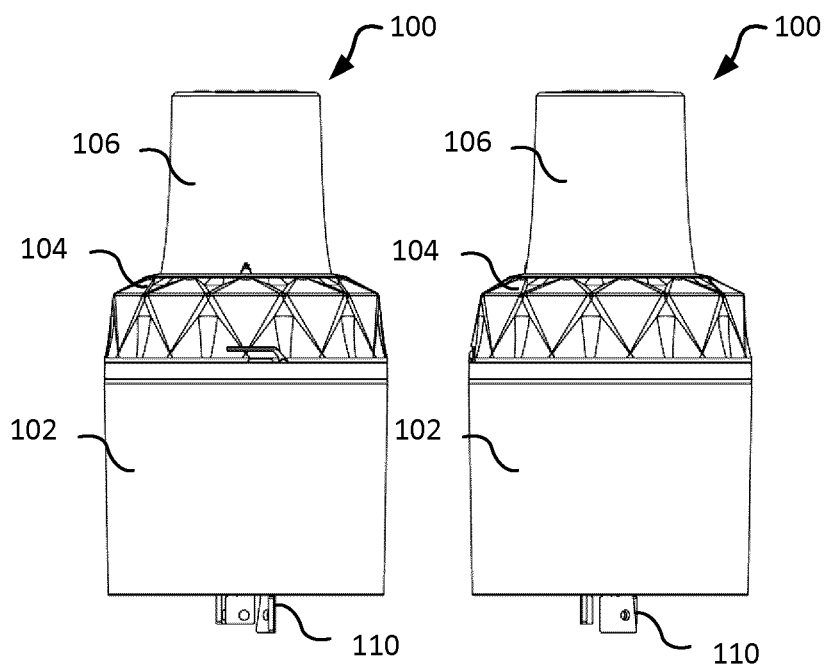
FIG. 1C shows a side view of the streetlight sensor platform.
FIG. 1D shows a front view of the streetlight sensor platform.

Embodiments are described below, by way of example only, with reference to FIGS. 1 to 15.

A streetlight sensor platform comprising a sensor module which is coupled to a controller section having a lower portion for interfacing with a receptacle of a streetlight and an upper portion for receiving the sensor module. The sensor module is coupled to the controller section without the need for tools allowing easy installation and replacement. The sensor can be utilized for intelligent lighting and event notification such as public safety, emergency vehicle alerts, traffic monitoring, alerts and dynamic lighting applications.

In accordance with an aspect of the present disclosure there is provided a streetlight sensor platform comprising: a sensor module; and a controller section having a lower portion for interfacing with a receptacle of a streetlight and an upper portion for receiving the sensor module.

In accordance with another aspect of the present disclosure there is provided a method of operating a sensor module of a streetlight, the method comprising: detecting an event by the sensor module interfacing with a receptacle of a streetlight controller module; sending a notification of the event from the sensor module to the streetlight controller module; and sending by the streetlight controller module a wireless broadcast notification associated with the event to one or more surrounding streetlight controllers or a management system coupled to a mesh network.

In accordance with yet another aspect of the present disclosure there is provided a method of operating a sensor module of a streetlight, the method comprising: detecting an event by the sensor module interfacing with a receptacle of a streetlight controller module; sending a notification of the event from the sensor module to the streetlight controller module; and increasing a light output of the streetlight by the streetlight controller module in response to the notification.

FIG. 1A to 1D shows views of a streetlight sensor platform 100. The sensor platform 100 provides tool-less coupling of a streetlight controller module 102 and an interchangeable sensor 106 in a single platform. The streetlight controller module 102 controls the operation of a power supply of a streetlight fixture with interaction from the sensor component 106. The controller module 102 interfaces with a light fixture by mating receptacle by pins 110 on the base of the controller module 102. The pins 110 are configured to interface with a receptacle such as for example but not limited to NEMA ANSI C136.10 or NEMA ANSI C136.41. The receptacle can utilize a twist lock connection providing an interface to control a power supply of the light fixture. A locking nut 104 secures a sensor module 106 to the top of the streetlight controller module 102. The locking nut 104 enables tool-less installation of different sensors modules 106 with a common controller 102. The sensor modules 106 may be for example, but not limited to, radar, motion, temperature, environmental, pollution, camera (video), sound, light sensors (directed or ambient), noise, radiation, location based information for autonomous vehicle, radio frequency (RF) detection, wireless interfaces such as LoRa™, Bluetooth™, Wi-Fi™ or cellular microcell. The sensor may also include or communicate with other sensors such as acoustic, leak detection devices; pressure gauges; water quality instrumentation; remote shutoff valves either through the meter or stand-alone devices; smart parking systems; smart noise measurement systems; cycling and pedestrian count systems; traffic/vehicle counting systems; smart waste management systems; smart water pollution level measurement systems; smart irrigation control systems; snow level monitoring systems; and black ice level monitoring systems.

Figure 2:
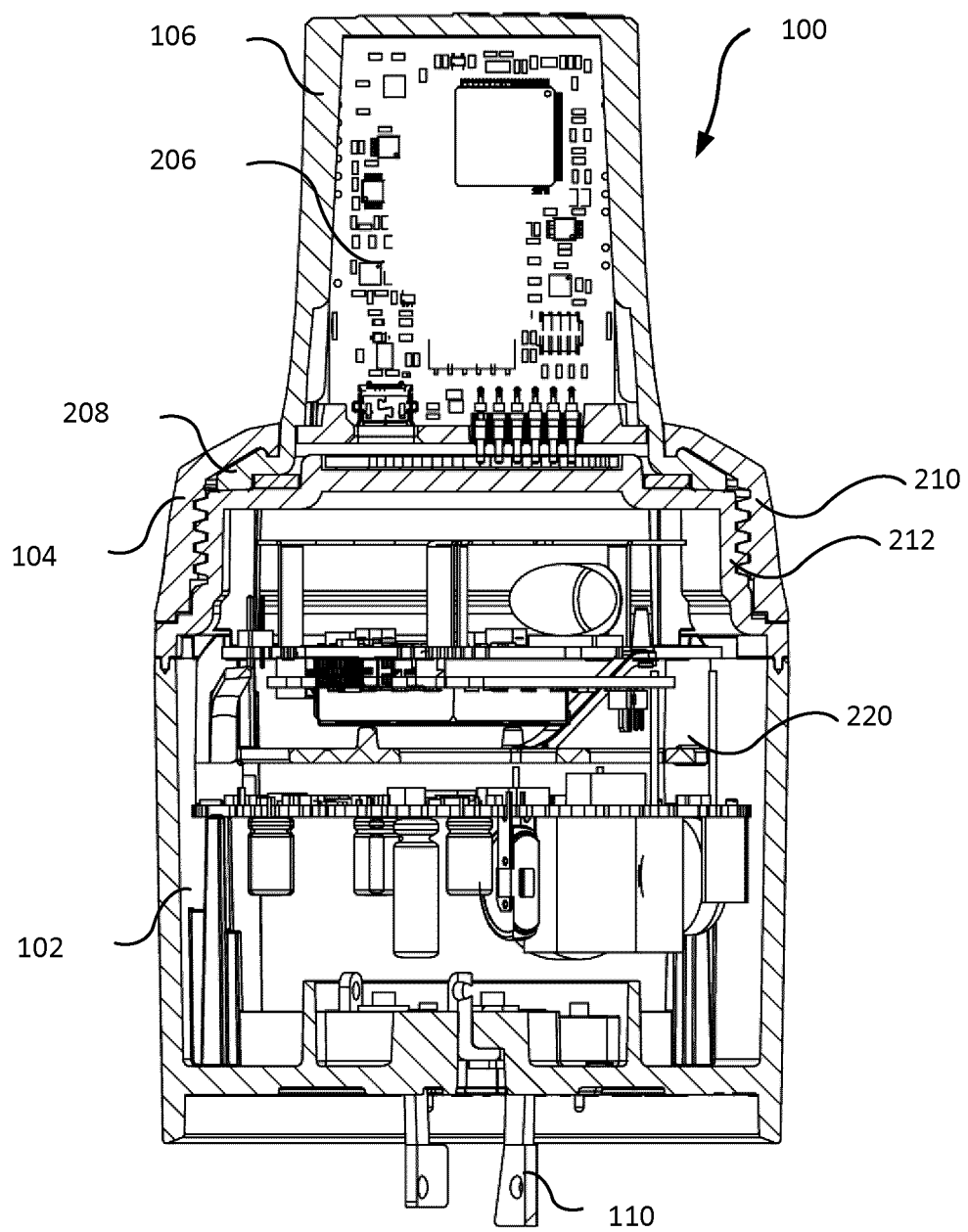
FIG. 2 shows a cross-sectional view of the streetlight sensor platform shown in FIGS. 1A-1D.

In the cross-sectional view shown in FIG. 2, the sensor electronics 206 are contained within the sensor module 106. A flange 208 on the base of the sensor module 106 is covered by the locking nut 104 which engages the top portion of the controller 102. An interior thread 210 of the locking nut 104 mates with threads 212 on top portion of the streetlight controller module 102 to couple the sensory module 106 and controller module 102 together. The interior of the controller module 102 contains electronics 220 for controlling the streetlight fixture and communication with a network controller.

Figure 3:
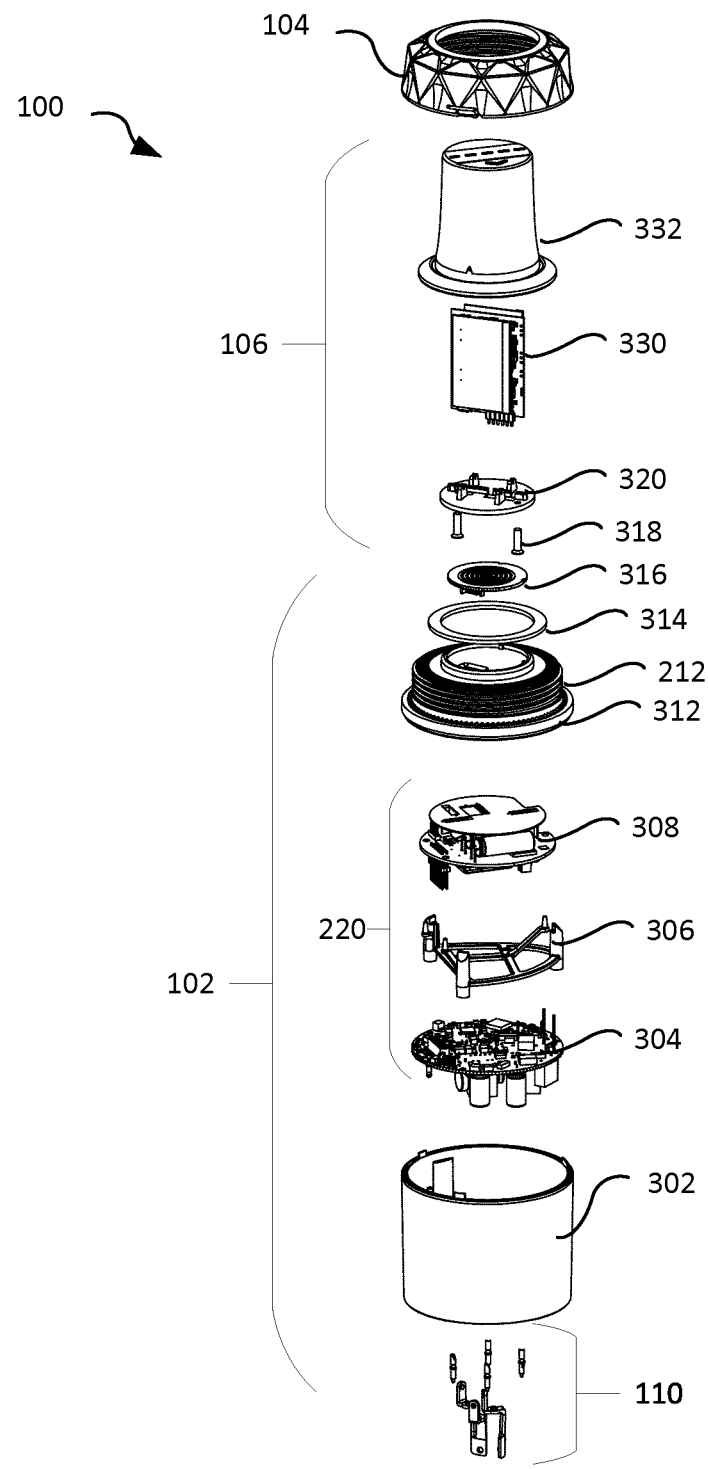
FIG. 3 shows an exploded view of the streetlight sensor platform shown in FIG. 2.

FIG. 3 shows an exploded view of the sensor platform 100. The streetlight controller module 102 has a case 302 which provides protection to controller electronics 220. The controller electronics 220 is comprised of a PCB assembly 304, a radio module 308, and a PCB brace 306 secures the PCB assembly 304 and radio module 308 within the case 302. The PCB assembly 304 power supply interfaces with pins 110 which extend below the bottom of case 302. The radio module 308 allows for wireless communications using wireless technologies such as but not limited to Long-term Evolution (LTE) Direct (Peer-to-Peer) messaging or other cellular direct messaging platforms, or by local area network (LAN), such as Wi-Fi™, personal area network (PAN) technologies as Zigbee™ or Bluetooth™, or mesh or star wireless network topology.

In a first example of the sensor platform, a case cover 312 is provided at the top of the case 302 to cover the controller electronics 220. The case cover 312 has receiving threads 212 for engaging threads of the locking nut 104. A gasket 314 provides a seal between the case cover 312 and shroud 332. A PCB 316 having circular interface contacts on a top portion interfaces with the controller module 102 through an opening in the case cover 312. The circular interface contacts enable the sensor module 106 to be easily installed by allowing the spring loaded headers 402 of the sensor module 106 at any position along the surface of the circular contacts therefore not requiring directional alignment of the sensor module. The circular interface contacts are positioned radially from the center of the sensor module 106. The sensor module 106 comprises a shroud 332 which covers PCB assembly 330 of the sensor module components. The PCB assembly 330 interfaces with a PCB mounting plate 320 which is retained to the shroud 332 by screws 318. Alternatively a latch or clamp retention mechanism may be utilized in place of the locking nut to retain the sensor 106 to controller 102. A bottom flange of the sensor may be secured by the latch to the controller. The sensor module 106 may utilize different shroud configurations based upon the type of sensor utilized.

Figure 4:
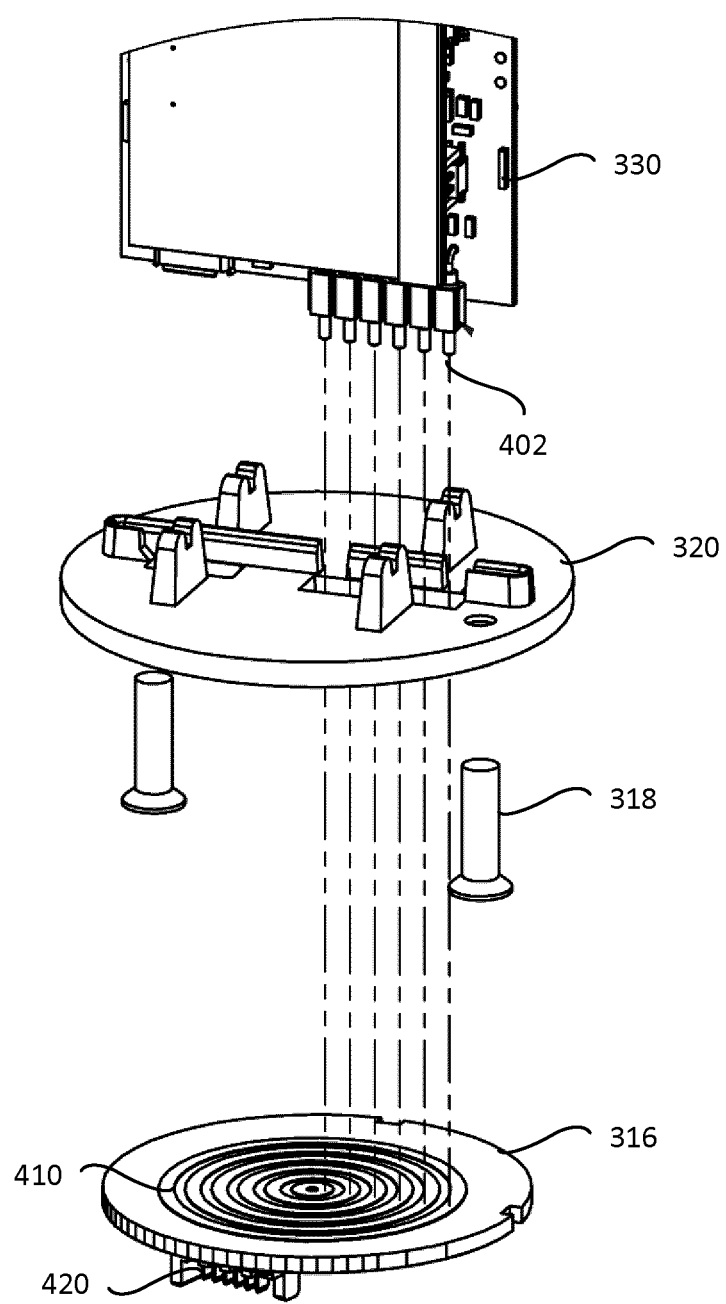
FIG. 4 shows an exploded view of a first example of a sensor platform module interface shown in FIG. 2.

With reference to FIG. 4, in a first example of a power communication interface the PCB assembly 430 has spring loaded headers 402 which extend through the PCB mounting plate 320 to engage with respective interface contacts 410. The spring loaded headers 402 can be rotated about the circular axis of the interface contacts 410. The interface contacts 410 transition to an interface header 420 providing a communication and power interface with the controller 102.

Figure 5:
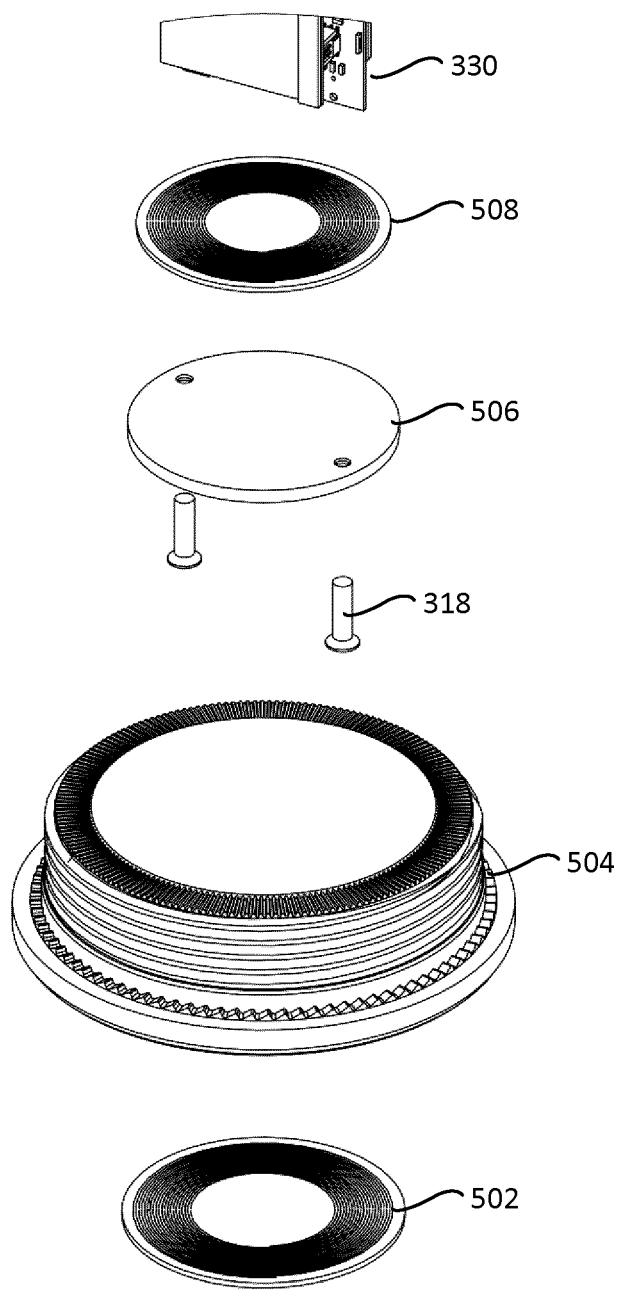
FIG. 5 shows an exploded view of a second example of the sensor platform interface shown in FIG. 2.

FIG. 5 shows a second example of the sensor platform mount 210 utilizing an inductive power interface to provide power to the sensor module 106. In this example the sensor module 330 connects to an inductive power interface 508 such as for example a Qi™ inductive power interface, coupling a wireless power transmitter 502 in the controller 102. The inductive power interface enables the case cover 504 to be a sealed unit separating the controller 102 from the sensor module. The controller 102 can interface with the sensor module 106 by a short range wireless technology such as but not limited to Bluetooth™ to exchange data and control information.

Figure 6A:
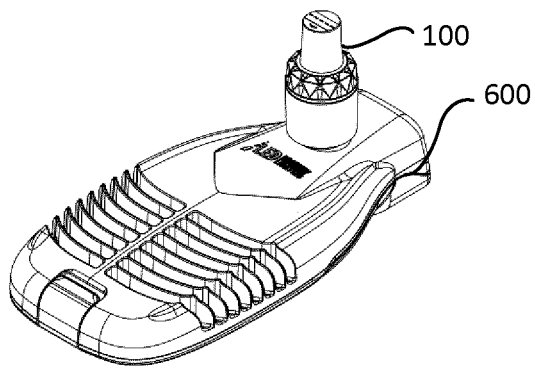
FIG. 6A shows a perspective top view of the sensor platform installed on a streetlight.
Figure 6B:
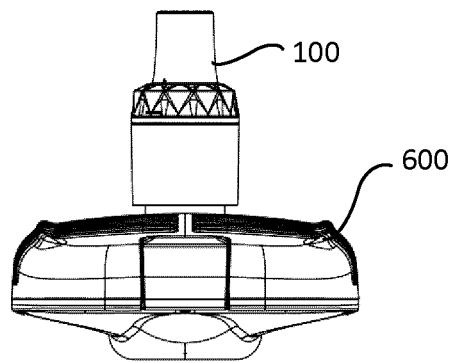
FIG. 6B shows a front view of the sensor platform installed on a streetlight shown in FIG. 6A.
Figure 6C:
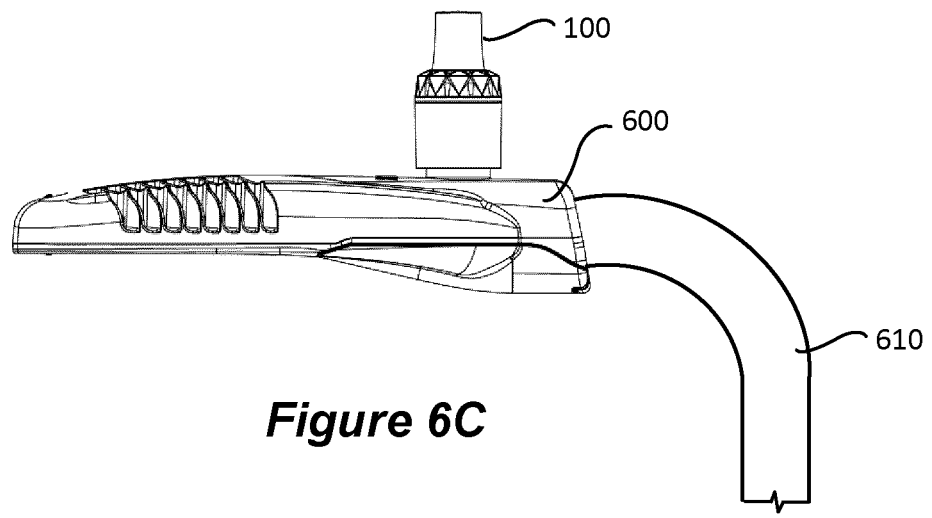
FIG. 6C shows a side view of the sensor platform installed on a streetlight mounted on a pole.

FIGS. 6A-6C shows a perspective top view, front view and side views respectively of the streetlight sensor platform 100 installed in a receptacle on the top of a streetlight 600. The streetlight 600 is mounted on a pole 610. The sensor platform 100 positions the sensor 106 above the body of the streetlight 600 enabling the sensor to survey a detection area below or to the side of the streetlight. Alternatively the sensor platform 100 may connect to a receptacle on the underside of the light fixture.

Figure 7A:
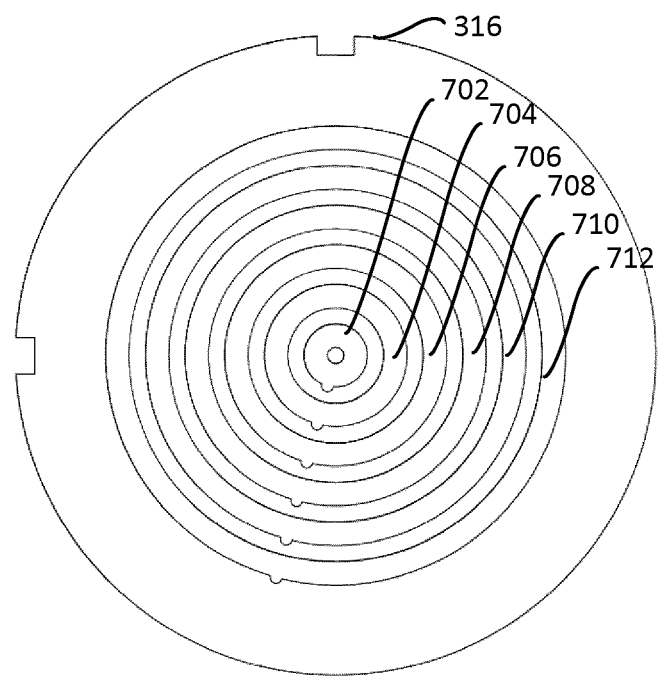
FIGS. 7A and 7B show top and bottom views of the sensor PCB interface.
Figure 7B:
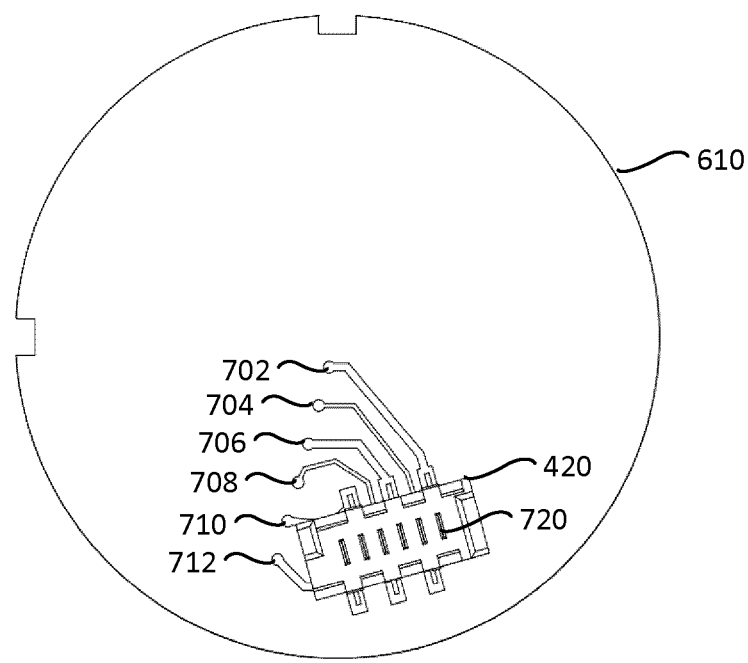

FIG. 7A a show top of the sensor PCB interface 316. The top surface provides circular interface contacts 702-712 which form expanding rings extending from the center of the PCB 316 increasing in diameter. The contacts 702-712 transition through the PCB 316 to an interface header 420 on the bottom surface of the PCB 316 shown in FIG. 7B. The interface header 420 has contacts 720 for interfacing with data and power supply connections provided through the controller electronics 220 or power supply connections. The circular contact rings 702-712 enables the sensor 106 to be placed on top of the controller 102 without requiring a particular orientation to enable the interface. Similarly the contact rings allow the selection of a particular orientation at the time of field installation, or allow future adjustments of orientation. The controller 102 can communicate with the sensor 106 and determine the type of sensor provided and configure the sensor and initiate the data interface.

Figure 8:
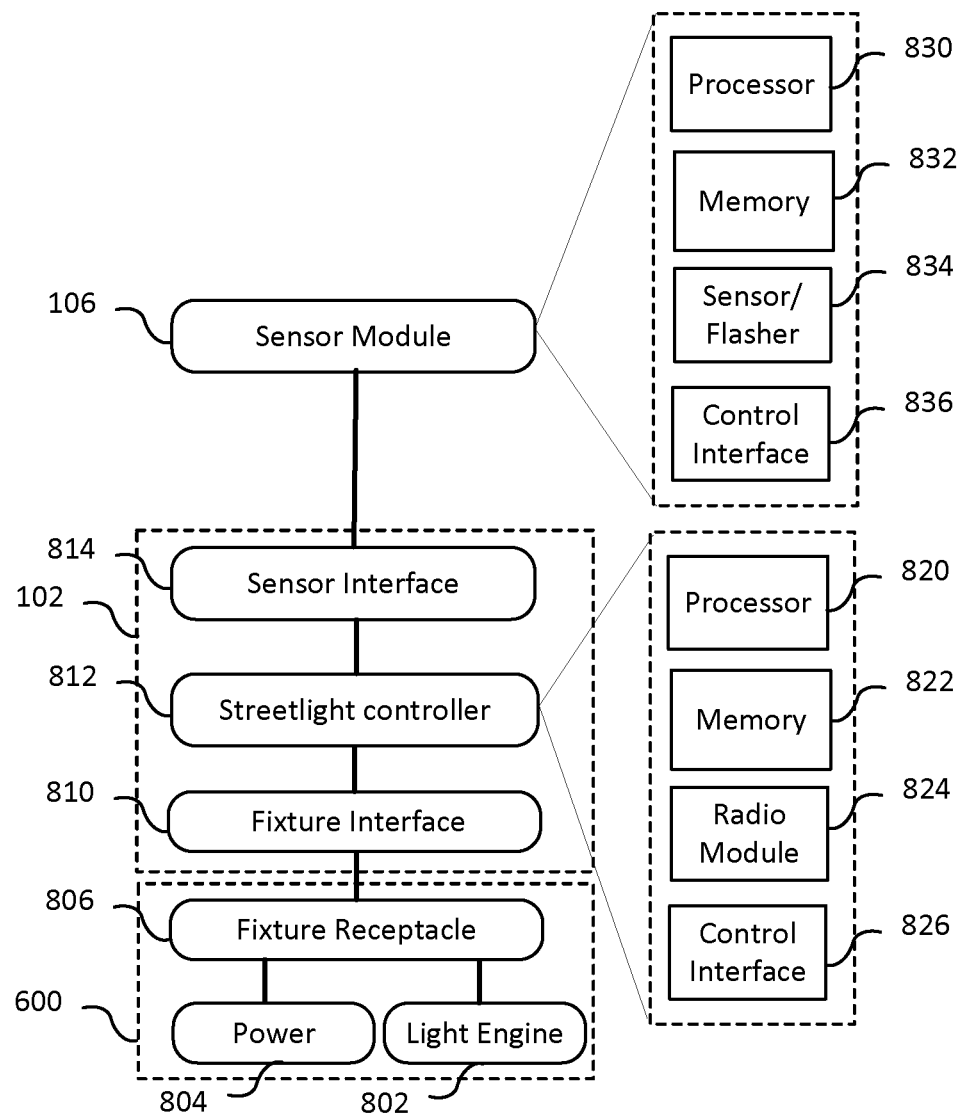
FIG. 8 shows a functional representation of the sensor platform.

FIG. 8 shows a functional representation of the sensor platform including a sensor module. The sensor platform 100 interfaces with the streetlight 600 by mounting into receptacle 806 provided on the top of the street light fixture body. The fixture receptacle 806 connects to power interface 804 and the control interface to light engine 802 of the streetlight 600. The power interface 804 is provided through the sensor platform fixture interface 810 to power the streetlight controller 812. The streetlight controller 812 comprises at least a processor or controller 820 coupled to memory 822 containing instructions for processing commands received from a sensor module through a direct interface, other streetlight controllers and management system through a radio module 824. The streetlight controller module 812 also provides a control interface 826 for controlling the light engine 802 through 0-10V or DALI dimming. The sensor module interface 814 provides power to the sensor module 106 and also enables data to be transferred to the streetlight controller module 812 if required. The sensor module 106 interfaces with the streetlight controller 102 as previously described in connection with FIGS. 1-7. The sensor module 106 comprises a processor 830 and memory 832 containing instructions for processing data received from one or more sensors 834 and/or interfacing with a flasher. The sensor has a control interface 836 which receives power and can communicate via sensor interface 814 to the streetlight controller.

Figure 9:
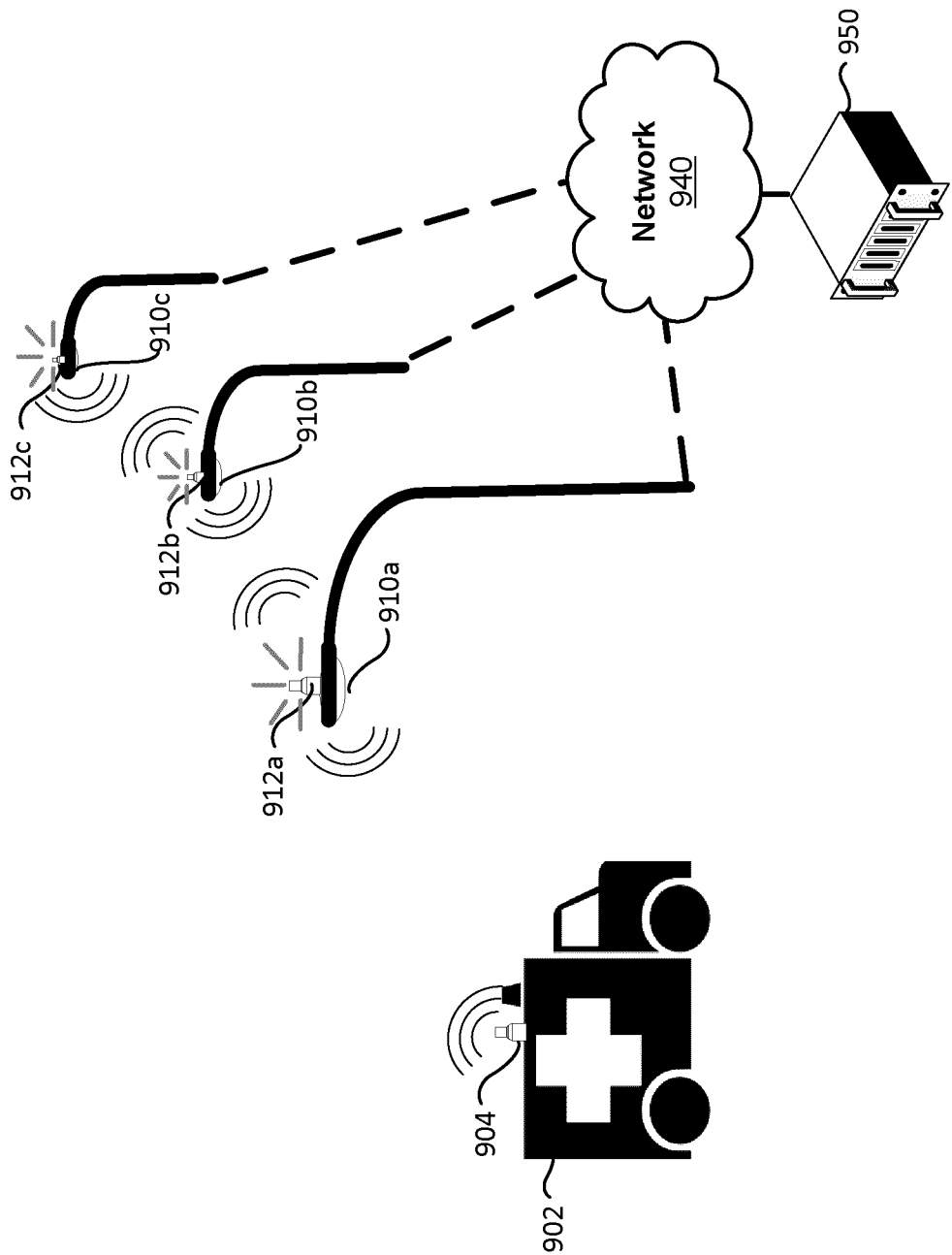
FIG. 9 shows a system of for emergency vehicle notification with the sensor platform.

FIG. 9 shows a system for emergency vehicle notification using the sensor platform. The sensor platform 100 may be utilized to enable intelligent street lighting control in response to emergency vehicles and provide a visual indication of an approaching emergency vehicle. Emergency vehicle 902 has a wireless node 904 compatible with the sensor platform network 940, which is for example a wireless mesh network. The signal from the wireless node 904 is detected by controller 912a as it moves through the network provided by the streetlight radio nodes. The streetlight controller detects and validates the RF message indicating that an emergency flasher and/or increased light output is required. The flasher is for example a flashing red light for a defined period of time or while the signal is still being received. The streetlight controller can also increase the output of the streetlight fixture 910a to 100% or some other predefined percentage for a predefined period of time (i.e. 30 seconds, 1 minute) by instructing the controller to increase output via dimming output to the streetlight from the mean controller (0-10V or DALI) over ANSI C136.41 interface. The streetlight controller 912a can then transmit an event broadcast to other streetlight controllers 912b and 912c to activate their associated flashers and/or change lighting level via the lighting control mesh network. Neighboring controllers can verify that the received message is from a neighboring controller based upon a list defining neighboring streetlights provided by a management system 950 through network 940. For example streetlights not on the same streets may receive the broadcast but may not activate their flashers and/or change lighting level as the sender streetlight controller is not defined as a neighbor on the same street, but may share the same mesh network. The management system 950 may also be notified of activation of the flashers to be identify at a control center. Each streetlight may not have a sensor platform but will have a streetlight controller than can communicate via the mesh network.

Figure 10:
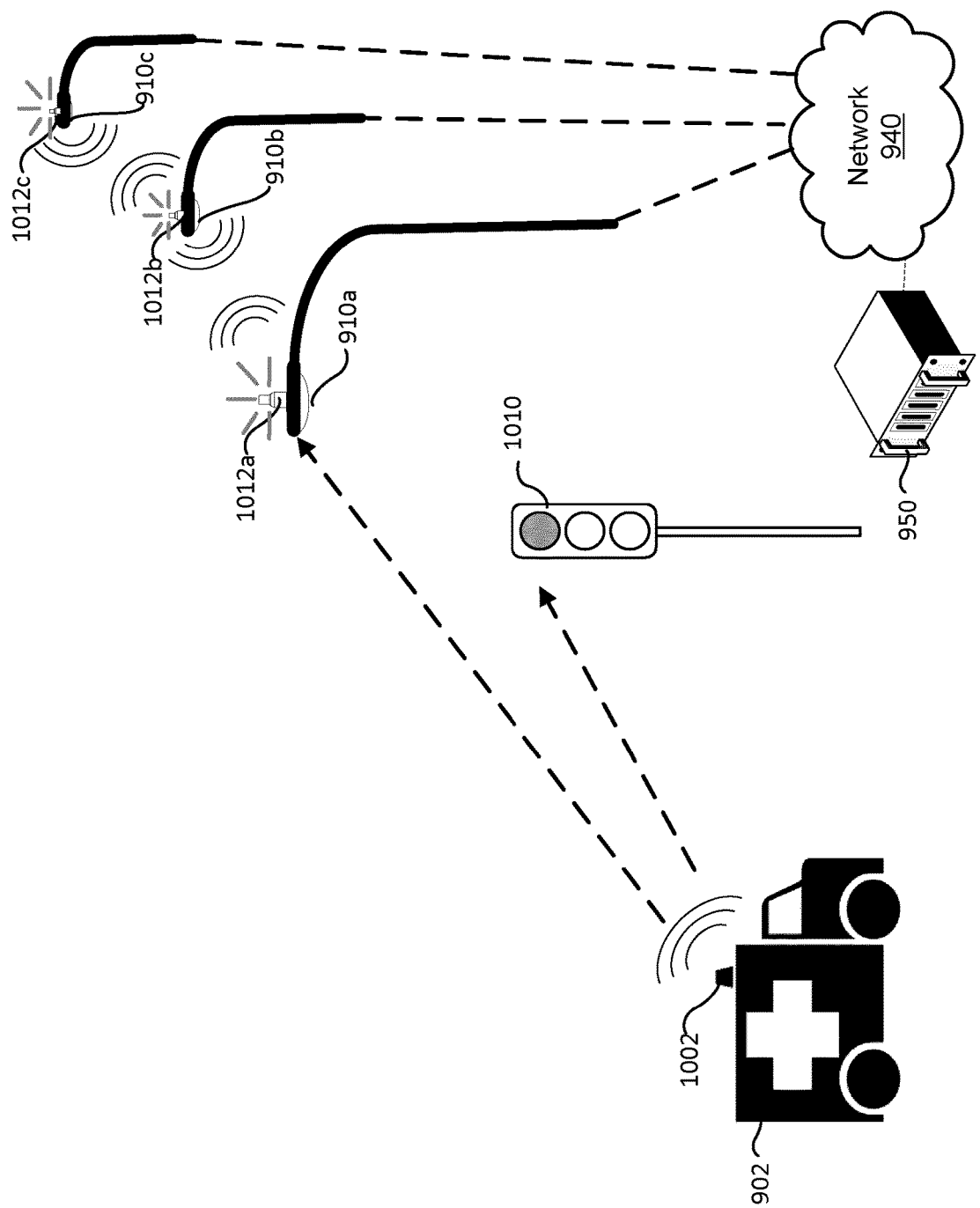
FIG. 10 shows a system of traffic light control for emergency vehicle prioritization with the sensor platform.

FIG. 10 shows a system of traffic light control for emergency vehicle prioritization using a sensor module. In contrast to the example shown in FIG. 9, the emergency vehicle has a dedicated infrared or radio frequency traffic signal prioritization interface which emits an infrared beam, or specific radio frequency (RF) signal 1002 from the emergency vehicle 902 to traffic lights 1010 to change the signals of the lights in the direction of movement of the emergency vehicle 902. In this example the sensor platform 1012a has a compatible infrared or RF receiver to process the emergency vehicle prioritization transmission and enable the indicator to alert the surrounding public of an approaching vehicle. When a signal is detected by the sensor module 106 the streetlight controller 1012a is notified of the event by the sensor module. The streetlight controller can then turn on the streetlight 910a to 100% output or some other predefined percentage for a predefined period of time. As described in FIG. 9 the streetlight controller may broadcast to surrounding streetlight controllers 1012b-1012c to activate their flasher and/or increase light output.

Figure 11:
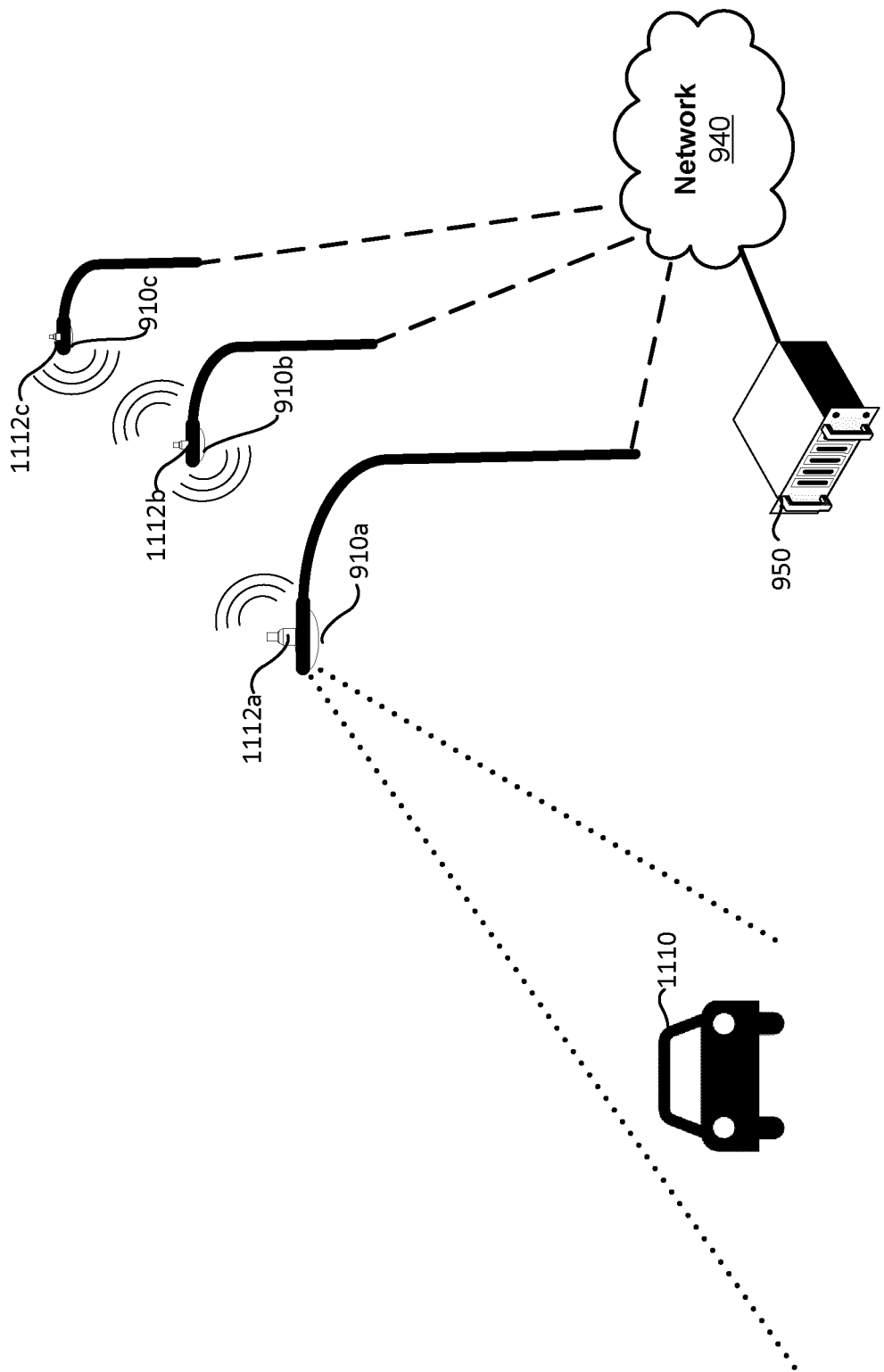
FIG. 11 shows a representation of presence detection and monitoring with the sensor platform.

FIG. 11 shows a system for presence detection using a sensor module. In this example the sensor platform is provided with a camera or radar module 1112a which is directed downwards towards and area on the ground to be monitored. The camera or radar may be used to detect the presence of objects within a particular area to determine for example if a vehicle is parked, or to count traffic. In the application of determining the presence of vehicle or pedestrian by radar in the sensor module 1112a can send a broadcast message to neighboring streetlight controllers 1112b-112c to increase light output for a predetermined period of time as previously described. For a parking application, when a camera in the sensor module 1112a detects when a vehicle 1110 is present, a message is sent to the network 940 and the management system 950 to notify a parking management system that a space is occupied.

Figure 12:
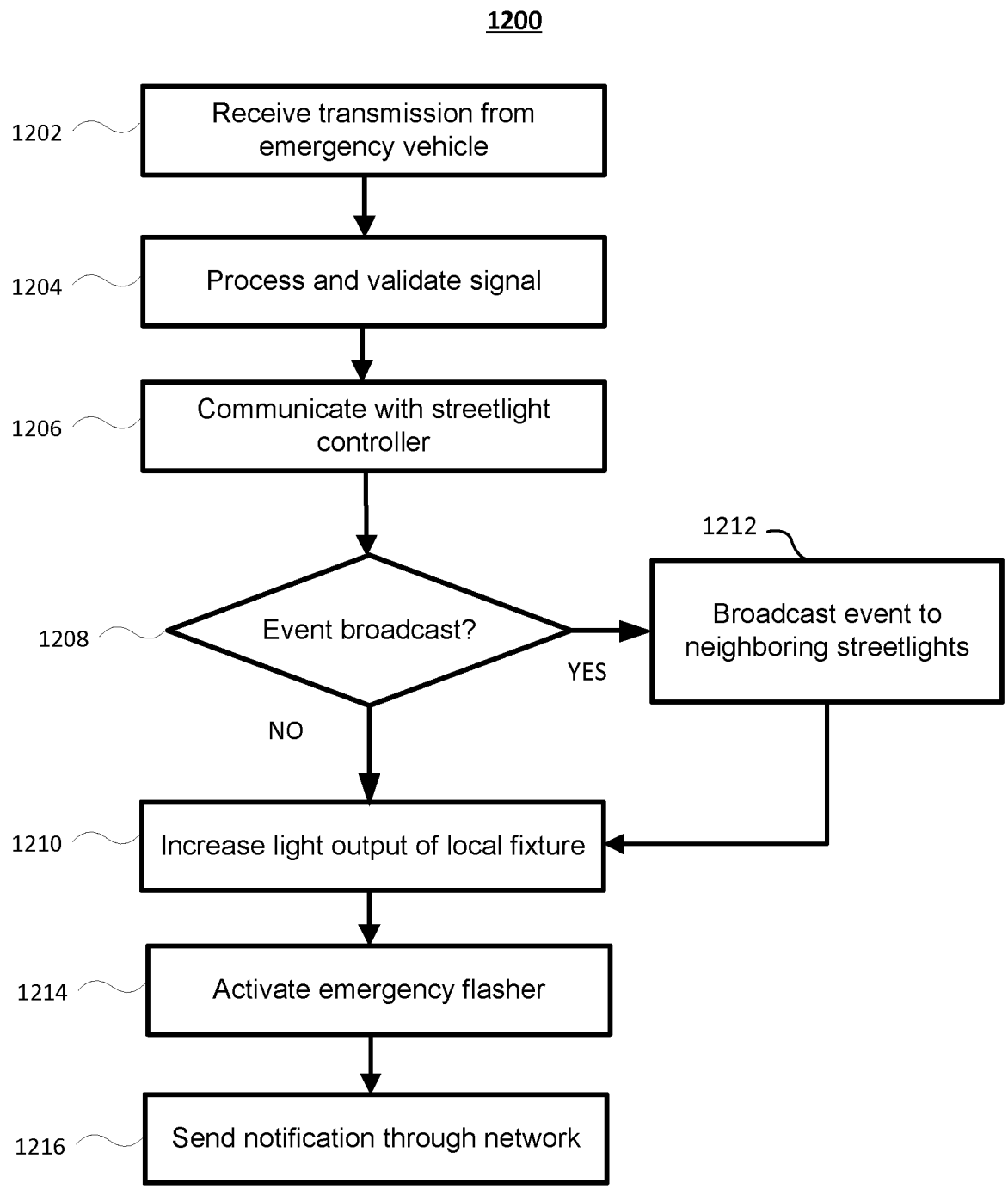
FIG. 12 shows a method of emergency vehicle notification or prioritization operation with the sensor platform.

FIG. 12 shows a method of emergency vehicle notification or prioritization operation using a sensor module. The method 1200 commences through reception of a transmission from an approaching emergency vehicle (1202). The transmission can be from a wireless node compatible with the streetlight controller wireless network, or dedicated wireless or IR transmitter for vehicle prioritization for signaling lights. The received signal is processed and validated (1204). The reception of the event is communicated with the streetlight controller (1206). The streetlight controller can then determine if an event broadcast is required to other streetlight controllers. If an event broadcast is enabled (YES at 1208) a broadcast message is sent identifying the event. The receiving streetlight controllers can then verify if the sending streetlight controller is identified as a valid neighbor and activate a flasher and/or increase light output. The output of the sending streetlight controller output can then be increased (1210) and the emergency flasher of the sensor module can be activated (1214). An event timeout can then occur at a predefined period of time or based upon a parameter provided in the emergency message to turn off the flasher and return the lighting level to a previous or lower lighting level. An event notification can then be transmitted to the management system (1216) that an event has occurred and may also advise when an event is completed.

Figure 13:
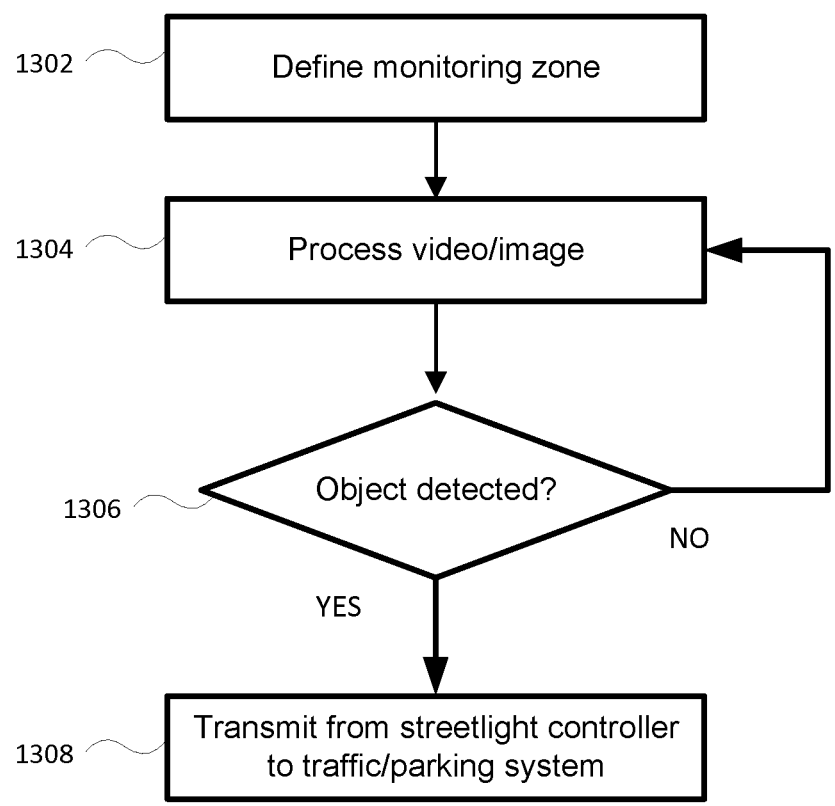
FIG. 13 shows a method of video detection with the sensor platform.

FIG. 13 shows a method of video detection using a sensor module. A monitoring/detection zone can be defined for monitoring by the video camera provided in the sensor module (1302). The video image generated by the camera is processed locally (1304) to determine if an object is within the presence detection zone. If an object is detected (YES at 1306) a message can be transmitted to the management system through the network to notify the traffic or parking system of the event (1308). If an object is not detected (NO at 1306) the local video continues to be processed. The event detection may trigger the uploading of video for a time period around an event through the network to a server. Alternatively, the video detection may be utilized to count traffic which is uploaded for a fixed time identifying a number detected objects which meets a particular threshold. The objects may be sub-categorized by type that have been identified such as vehicles, pedestrians, and bicycles. The management system can communicate traffic data message (for period X it was observed that quantity A vehicles, quantity B pedestrians, quantity C bicycles were observed) over the network to a monitoring system, which then can display data or exchange data with a third-party traffic system for further analysis.

Figure 14:
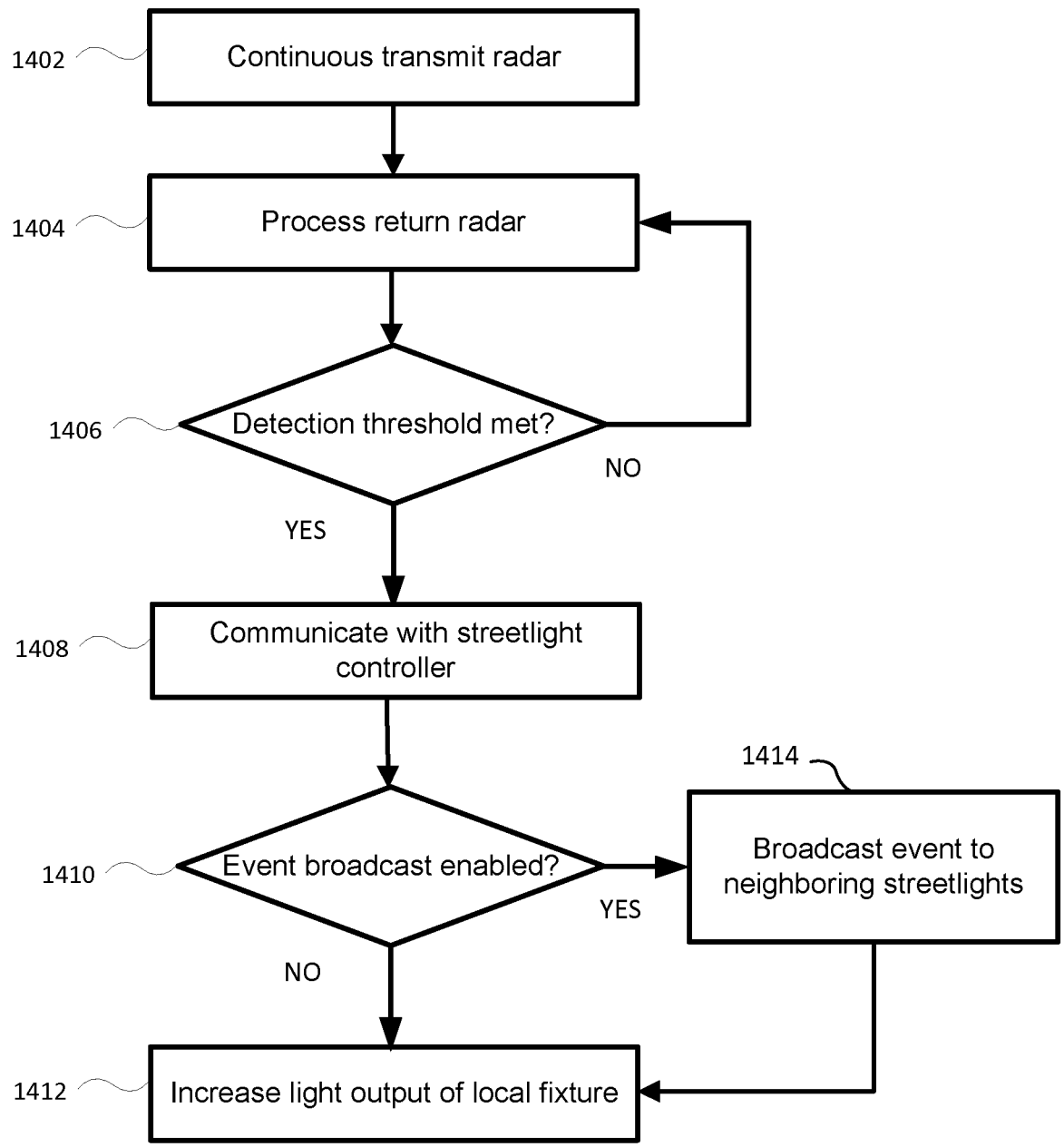
FIG. 14 shows a method of presence detection with the sensor platform.

FIG. 14 shows a method of presence detection using a sensor module. A radar module of the sensor module transmits a radar signal to an area defined by the pattern of the respective radar antenna (1402). The return radar signal is processed (1404) and if a detection threshold is met (YES at 1408) the event, or trigger, is communicated to the streetlight controller. The streetlight controller may then broadcast (YES at 1410) the event to other streetlight controllers, with neighboring streetlight controllers increasing their light output (1414). The light output of the local streetlight is then increased by the streetlight controller (1412) for a pre-determined period of time.

Figure 15:
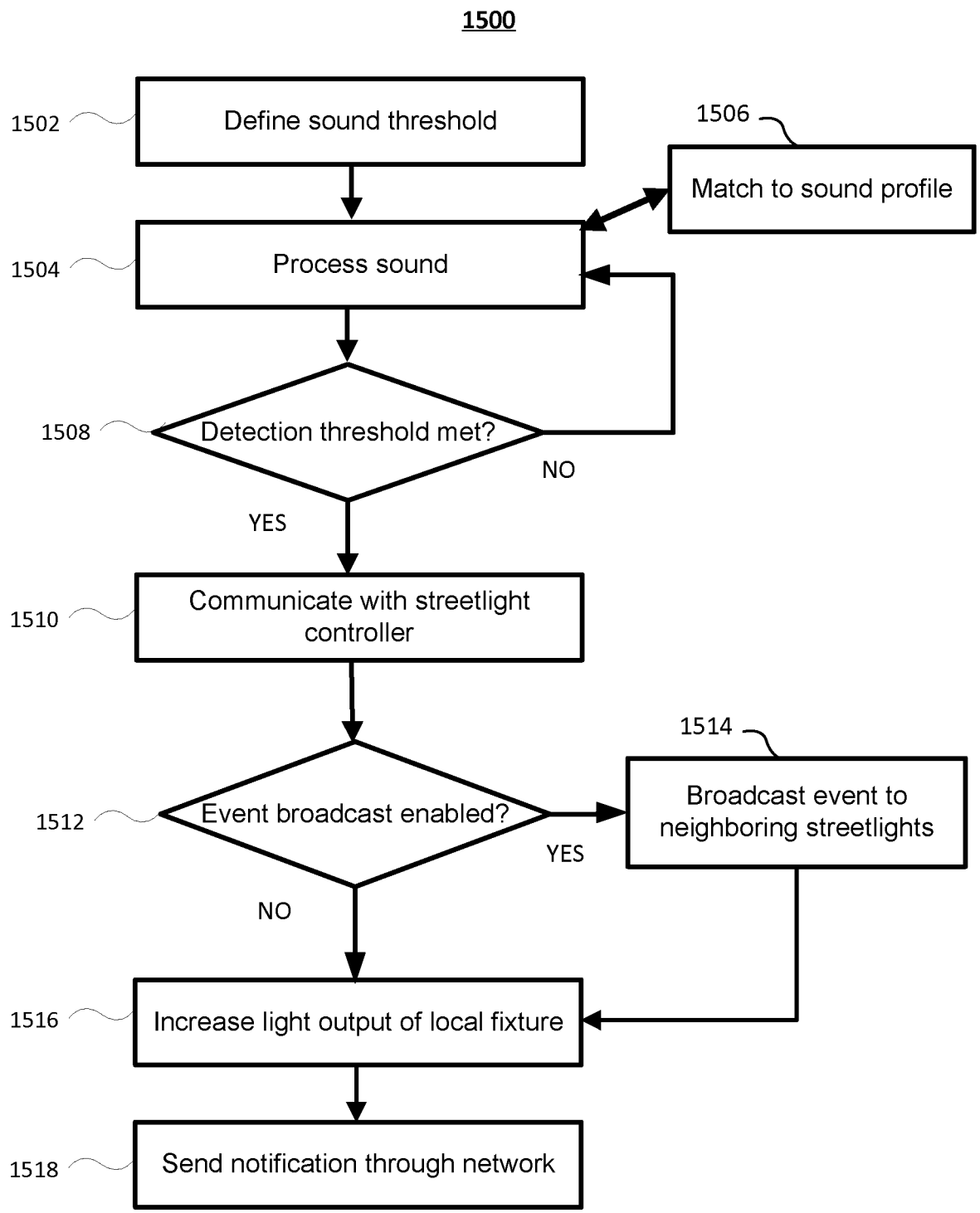
FIG. 15 shows a method of sound detection with the sensor platform.

FIG. 15 shows a method of sound detection using a sensor module. A sound threshold is defined (1502), such as for example 45 to 55 dB, to activate a sound detector in the sensor platform to process the sound (1504). When sound is above a threshold (YES at 1508) the sensor module communicates with the streetlight controller (1510). The streetlight controller may then broadcast (YES at 1512) the event to other streetlight controllers with neighboring streetlight controllers increasing their light output (1514). The light output of the local streetlight is then increased by the streetlight controller (1516) for a pre-determined period of time. The sound detection may alternatively also utilize signatures or profiles to match specific sounds to events (1506) such as for example a gunshot, glass break, or an accident to generate specific notifications which are provided through the network. The sound signatures may also be used to triangulate the position of the source of the sound to help locate the position of a possible incident. Further processing of keywords may be provided by the controller or utilize network-based audio processing. Audio data may be provided or streamed to the network when an incident or threshold is exceeded.

The sensor module may also be utilized to communicate other types of events by specific flasher colors. For example for emergency evacuation routes a blue light may be activated, for an environmental or weather alert an earthquake, hurricane or tornado warning a yellow light may be utilized, for emergency vehicles a red light, and other colors based on the application. The flasher may be triggered by a sensor in the sensor module or by messaging provided by the management system.

It is contemplated that the functionality of multiple separate components described herein could be provided in a single component. Accordingly, while example systems, methods and apparatus are described, persons having ordinary skill in the art will readily appreciate that the examples provided are not the only way to implement such systems, methods and apparatus.

The invention claimed is:

1. A streetlight sensor platform comprising:
an interchangeable sensor module; and
a controller section, the controller section comprising:
    a lower portion for interfacing with a receptacle positioned on an exterior of a body of a streetlight fixture for providing power to the controller section; and
    an upper portion for receiving and securing the interchangeable sensor module thereto,
    wherein the controller section is powered by the streetlight fixture and the controller section provides a connector to the interchangeable sensor module to power the interchangeable sensor module,
    and the controller section interfaces with the interchangeable sensor module and provides data from the interchangeable sensor module to one or more surrounding streetlight controllers or a management system coupled to a wireless network through a wireless network interface.

2. The streetlight sensor platform of claim 1 wherein the sensor module is secured to the controller section by a locking nut screwed by a thread on the upper portion of the controller section.

3. The streetlight sensor platform of claim 1 wherein the sensor module is secured to the controller section by a latch mechanism retaining the sensor module to the controller section.

4. The streetlight sensor platform of claim 1 wherein the connector provides power and data transfer with the sensor module.

5. The streetlight sensor platform of claim 1 wherein the connector is provided by interface pins extending from the base of the interchangeable sensor module which contact a plurality of circular interface contacts on a circular printed circuit board (PCB) in the controller section.

6. The streetlight sensor platform of claim 5 wherein the plurality of circular interface contacts are defined by contact rings provided on a top surface of the PCB board having a connector on the bottom surface of the PCB interfacing to the controller section.

7. The streetlight sensor platform of claim 6 wherein the contact rings increase in diameter from the center of the PCB.

8. The streetlight sensor platform of claim 7 wherein the sensor can be rotated about a center axis of the PCB while maintaining contact with the contact rings.

9. The streetlight sensor platform of claim 1 wherein a wireless power transmitter in the controller section provides power to the interchangeable sensor module.

10. The streetlight sensor platform of claim 9 wherein a wireless communication interface is provided between the controller section and the interchangeable sensor module.

11. The streetlight sensor platform of claim 10 wherein a wireless power receiver in the interchangeable sensor module receives power from the controller section.

12. The streetlight sensor platform of claim 1 wherein the controller section further comprises a PCB antenna assembly containing a wireless transceiver capable of communicating information wirelessly.

13. The streetlight sensor platform of claim 1 wherein the sensor module provides one or more of a motion sensor, an environmental sensor, a camera, a radar sensor, an infrared receiver, and a wireless receiver for emergency vehicle prioritization.

14. The streetlight sensor platform of claim 6 wherein the sensor module is a wireless receiver for emergency vehicle prioritization.

15. The streetlight sensor platform of claim 1 wherein the sensor performs one or more functions of: radar, motion, temperature, environmental, pollution, camera (video), or light sensors (directed or ambient), noise, radiation, location based information for autonomous vehicle, radio frequency (RF) detection, LoRa™, Bluetooth™, Wi-Fi™, cellular microcell, acoustic, leak detection devices, pressure gauges, water quality instrumentation, remote shutoff valves either through the meter or stand-alone devices, smart parking systems, smart noise measurement systems, cycling and pedestrian count systems, traffic/vehicle counting systems, smart waste management systems, smart water pollution level measurement systems, smart irrigation control systems, snow level monitoring systems, and black ice level monitoring systems.

* * * * *